United States Patent [19]
Miller et al.

[11] Patent Number: 6,124,869
[45] Date of Patent: Sep. 26, 2000

[54] METHOD AND APPARATUS FOR LOW COST SET MAPPING

[75] Inventors: Brian C. Miller; Peter J. Meier, both of Fort Collins, Colo.

[73] Assignee: Agilent Technologies, Palo Alto, Calif.

[21] Appl. No.: 09/082,172

[22] Filed: May 20, 1998

[51] Int. Cl.[7] .................................................. G06F 13/00
[52] U.S. Cl. ............................................ 345/523; 345/521
[58] Field of Search ................................. 345/501, 521, 345/507, 515, 523–525; 711/1, 100, 202

[56] References Cited

U.S. PATENT DOCUMENTS

| | | | |
|---|---|---|---|
| 5,588,011 | 12/1996 | Riggle | 714/792 |
| 5,940,090 | 8/1999 | Wilde | 345/517 |
| 6,012,077 | 1/2000 | Tai | 708/552 |

*Primary Examiner*—Kee M. Tung

[57] ABSTRACT

A method and apparatus for low cost set mapping in, for example, a computer graphics processor or communications device efficiently maps elements of one set into another set. When used in conjunction with a graphical display system the low cost set mapping logic enables a memory controller to efficiently communicate with a plurality of memory devices based upon a hierarchical computation scheme. The method and apparatus provide a pseudo-optimal mapping solution. By employing a pseudo-optimal mapping solution the low cost set mapping logic greatly reduces the computational resource required to perform the mapping operation.

10 Claims, 7 Drawing Sheets

Fig. 4A

| A | M | N |
|---|---|---|
| B | X | X |

Fig. 4B

| A | M | N |
|---|---|---|
| B | X | X |

Fig. 4C

| A | M | N |
|---|---|---|
| B | 1 | 3 |
|   | 0 |   |

Fig. 4D

| A | M | N |
|---|---|---|
| B | 1 | 1 |

Fig. 4E

| A | M | N |
|---|---|---|
| B | 0 | 3 |

|   | M | N | O | P |
|---|---|---|---|---|
| A | 0 | 2 | 3 | 3 |
| B | 1 | 1 | 2 | 1 |
| C | 0 | 0 | 0 | 0 |
| D | 0 | 3 | 3 | 2 |

Fig. 6A

|   | N | O | P | M |
|---|---|---|---|---|
| B | 1 | 2 | 1 | 1 |
| C | 0 | 0 | 0 | 0 |
| D | 3 | 3 | 2 | 0 |
| A | 2 | 3 | 3 | 0 |

Fig. 6B

|   | M | N | O | P |
|---|---|---|---|---|
| A | X |   |   |   |
| B |   | X |   |   |
| C |   |   | X |   |
| D |   |   |   | X |

Fig. 5A

|   | M | N | O | P |
|---|---|---|---|---|
| A |   | X |   |   |
| B | X |   |   |   |
| C |   |   |   | X |
| D |   |   | X |   |

Fig. 5B

|   | M | N | O | P |
|---|---|---|---|---|
| A |   |   |   | X |
| B | X |   |   |   |
| C |   |   | X |   |
| D |   | X |   |   |

Fig. 5C

|   | M | N | O | P |
|---|---|---|---|---|
| A |   |   | X |   |
| B | X |   |   |   |
| C |   | X |   |   |
| D |   |   |   | X |

METHOD AND APPARATUS FOR LOW COST SET MAPPING

BACKGROUND OF THE INVENTION

1. Field of the Invention

The present invention relates generally to set mapping, and, more particularly, to a low cost and low complexity method and apparatus for efficiently mapping one set containing N elements into another set containing N elements.

2. Related Art

Computer graphics systems commonly are used for displaying graphical representations of objects on a two-dimensional computer display screen. Current computer graphics systems can provide highly detailed representations and are used in a variety of applications.

In some computer graphics systems, and in other systems such as communication systems, set mapping functionality is necessary in the course of system design. The set mapping function is typically accessed repeatedly as system constraints change over time. A typical set mapping function calls for each of the N members of a set (set A) to be associated with one and only one of the N members of another set (set B). For example, where N broadcasters are mapped into N available channels. Each of these associations is a possible set mapping solution.

The set mapping function is typically cost optimized in that each mapping solution has a particular cost associated therewith. This cost is typically assigned by a device located within the system that continuously monitors data availability in memory and data requests in a memory controller. As the set size increases (for example, mapping a set containing eight (8) elements into another set containing eight (8) elements), the computation resources required to generate the optimal mapping solution become excessive. To illustrate for the mapping function mentioned above, there are N! possible legal mapping possibilities. Assuming that $N=2^m$, where m is an integer, $(N-1)*N$ adders and $(N!-1)$ comparators are required to calculate the optimal mapping solution. For N=8, this implies that 280000 adders and 40000 comparators are required to map a set containing eight elements into a set containing eight elements.

Thus, an unaddressed need exists in the industry for a more efficient method and apparatus for generating a cost optimized mapping solution for mapping sets containing N elements into sets containing N elements.

SUMMARY OF THE INVENTION

The invention provides an improved method and apparatus for mapping sets containing N elements into sets containing N elements. Although not limited to these particular applications, the method and apparatus are particularly suited to graphical display systems where memory controllers are mapped into available memory via individual channels.

The present invention can be conceptualized as a method for efficiently mapping information from a first set to a second set comprising the following steps. A first set having a plurality of elements is partitioned into at least one first two element subset. A second set having a plurality of elements is also partitioned into at least one second two element subset. Then a value is assigned to each location of a matrix occupied by each of the elements of the first two element subset and the second two element subset. Once the values are assigned, a cost associated with mapping each element of the first set into each element of the second set is calculated and then a pseudo-optimal mapping solution is determined based upon the calculated cost.

In architecture, when employed in connection with a graphical display system, the low cost set mapping apparatus is implemented as follows. The system is provided with a plurality of adders, each adder configured to add a first value to a second value. Also included are a plurality of comparators, each comparator configured to compare the output of each of the adders and select an optimized value. The greater than/less than outputs of the comparators contain the information describing the selected mapping based upon the values associated with each mapping possibility and are used to determine a pseudo-optimal mapping solution.

The invention has numerous advantages, a few which are delineated, hereafter, as merely examples.

An advantage of the present invention is that it provides a low cost solution to the set mapping function.

Another advantage of the present invention is that it reduces the amount of resource required to map a set containing N elements into another set containing N elements.

Another advantage of the invention is that it reduces the amount of processor time required to generate an optimal set mapping solution.

Another advantage of the invention is that it can be implemented in hardware, software, or a combination thereof. When implemented in software, it can be stored, utilized, and transported while residing on any computer readable medium. When implemented in hardware it can be done so in the form of an application specific integrated circuit (ASIC).

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIGS. 4A–4E are schematic views illustrating the low cost set mapping logic of FIG. 3 as applied to mapping a two element set into a two element set.

FIGS. 5A–5D are schematic views illustrating four of the 24 possible legal mappings of four element set [A,B,C,D] into four element set [M,N,O,P];

FIGS. 6A and 6B are schematic views illustrating sample values associated with each location of the matrix of FIGS. 5A–5D;

FIGS. 7A–7F are schematic views illustrating the operation of the low cost set mapping logic of FIG. 3 as applied to mapping a set containing four elements into a set containing four elements using the sample values of FIG. 6A.

DETAILED DESCRIPTION OF THE PREFERRED EMBODIMENT

The present invention can be implemented in hardware, software or a combination thereof. In the preferred embodiment, the elements of the present invention are implemented in hardware on an application specific integrated circuit (ASIC). If implemented in software, the foregoing software can be stored on any computer readable medium for transport or for use by or in connection with any suitable computer related system or method. In the context of this document, a computer readable medium is an electronic, magnetic, optical, or other physical device or means that can contain or store a computer program for use by or in connection with a computer related system or method.

Figure 1:
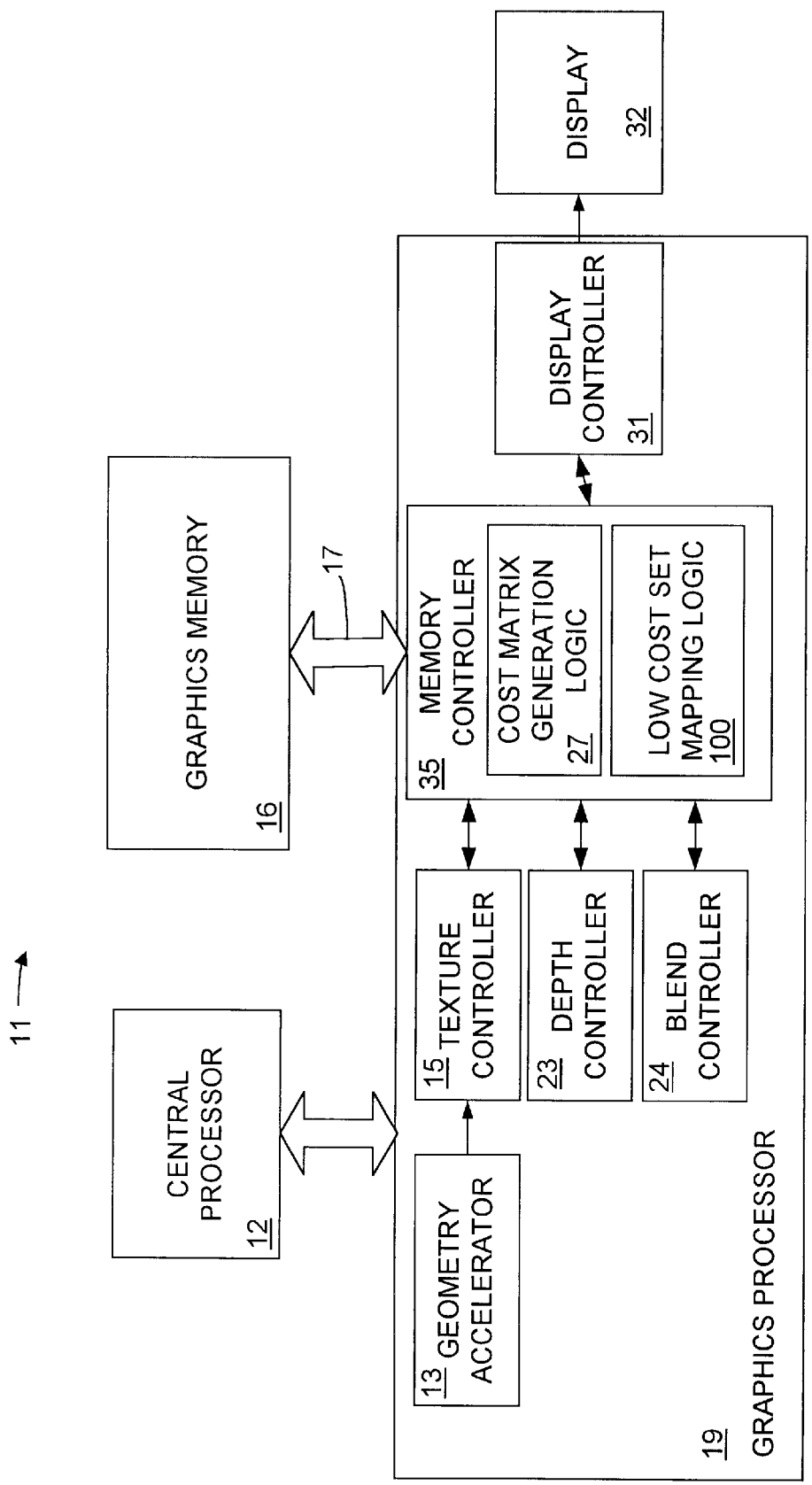
FIG. 1 is a block diagram of a graphical processor system including the low cost set mapping logic of the present invention.

Turning now to FIG. 1, shown is an example of a graphics display system 11 where the present invention may be implemented. Graphics display system 11 contains some components that are known in the art. Included is central processor 12, also known as a central processing unit (CPU), which communicates conventionally with a graphics processor 19. Graphics processor 19 includes a geometry accelerator 13, which communicates with a texture controller 15. Graphics accelerator 13 creates and rasterizes primitives and provides data. Graphics processor 19 further includes a memory controller 35, which communicates over dedicated connection 17 with graphics memory 16. Also included in graphics processor 19 is depth controller 23, blend controller 24, and display controller 31. Texture controller 15, depth controller 23, blend controller 24, and display controller 31 all communicate with memory controller 35 as known in the art.

Display controller 31 communicates with memory controller 35 and display 32 in order to display information to a user by generating a graphical display image on display 32.

Contained within memory controller 35 is low cost set mapping logic 100 of the present invention and cost matrix generation logic 27. Low cost set mapping logic 100 efficiently maximizes the transfer of data between graphics processor 19 and graphics memory 16. Graphics memory 16 is typically random access memory (RAM).

In a preferred embodiment, the low cost set mapping logic 100 is a combination of hardware elements configured and executed on an application specific integrated circuit (ASIC). Low cost set mapping logic 100 configures and drives hardware to be disclosed hereinafter, thereby efficiently mapping information from graphics processor 19 to the graphics memory 16.

Figure 2:
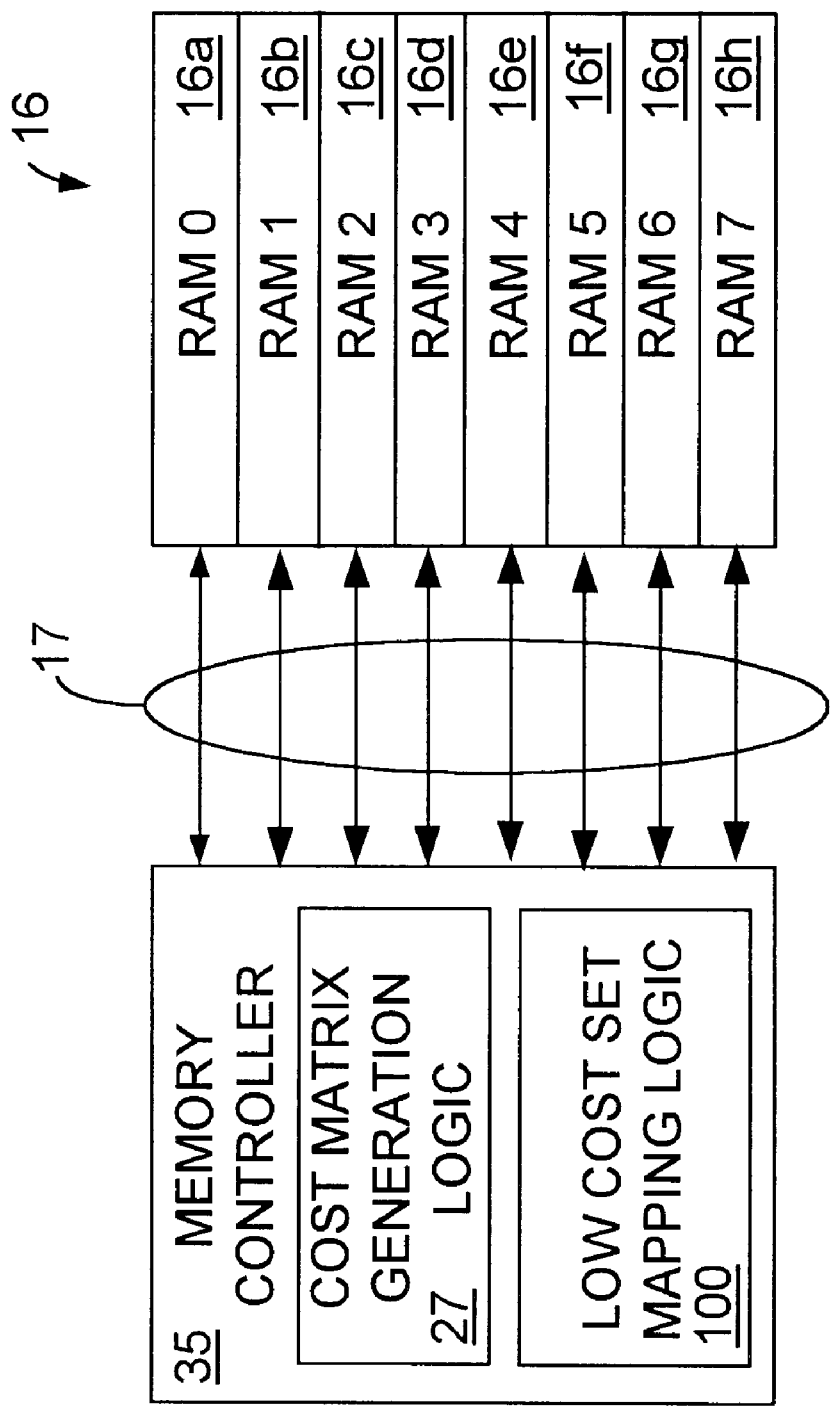
FIG. 2 is a block diagram illustrating the memory controller and the graphics memory of FIG. 1.

Turning now to FIG. 2, shown is a block diagram view illustrating the memory controller 35 and graphics memory 16 of FIG. 1. Connection 17, while depicted in FIG. 1 as a general bi-directional connection, in practice typically comprises a plurality of individual discrete bi-directional connections between a memory controller 35 and the graphics memory 16. With respect to FIG. 2, graphics memory 16 is illustratively depicted as individual RAM devices 16a through 16h each discrete RAM device having a discrete connection 17 to memory controller 35. In essence, for a preferred embodiment, there are eight individual RAM devices 16a–16h, each having a dedicated channel 17 for connection to memory controller 35.

Figure 3:
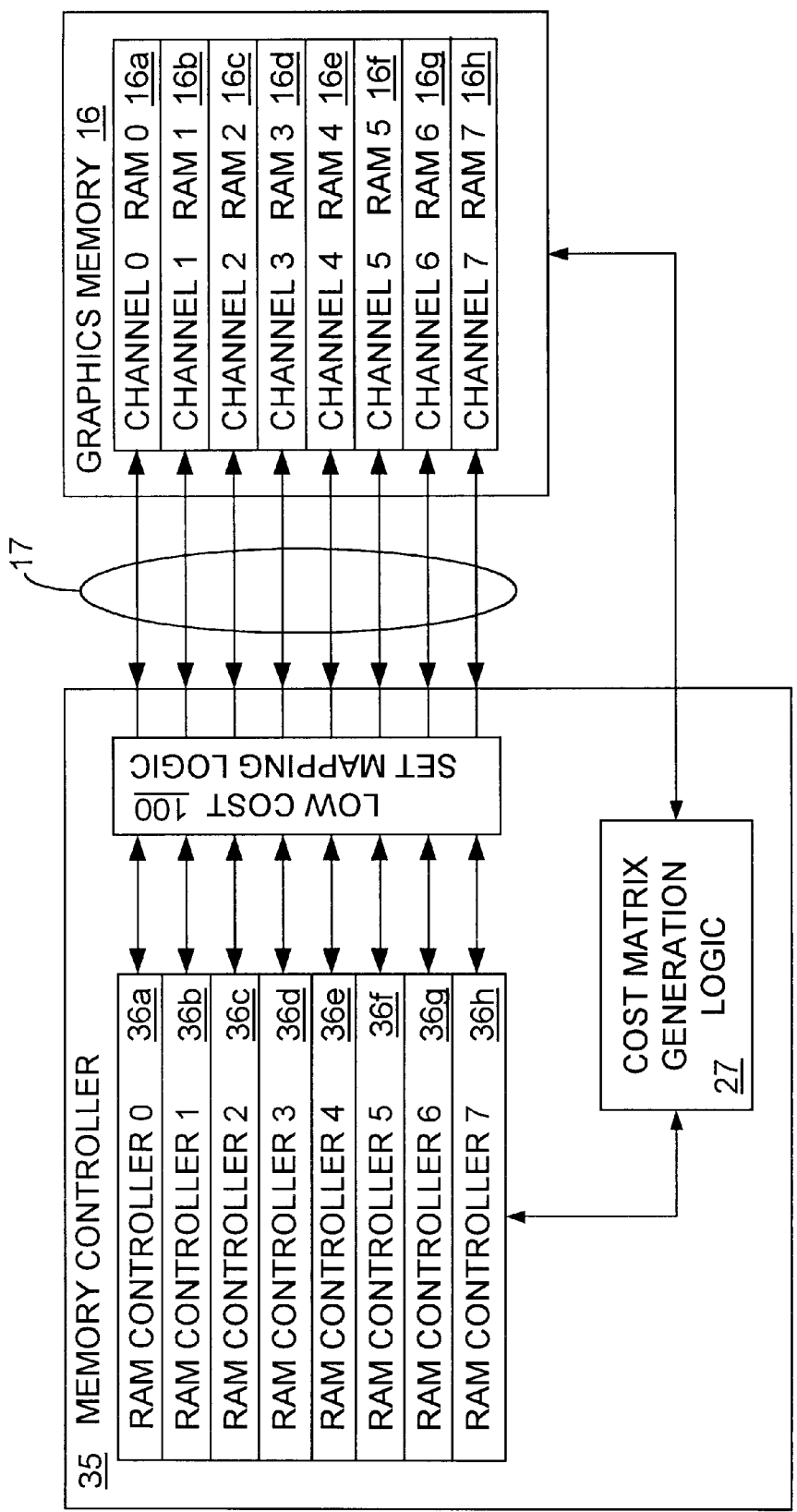
FIG. 3 is a block diagram view of the memory controller of FIGS. 1 and 2 including the low cost set mapping logic of the present invention.

FIG. 3 shows a detail view of the memory controller 35 and graphics memory 16 of FIGS. 1 and 2. Contained within memory controller 35 are individual RAM controller devices 36a–36h connected through low cost set mapping logic 100 to eight RAM devices 16a–16h of graphics memory 16.

Over a period of time and during typical operation different RAM controllers 36 may desire communication with different RAM devices 16. For example, it may be desirable for RAM controller 36a to communicate with RAM device 16d, and so on. There is a cost associated with each RAM controller 36 communicating with each RAM device 16. This cost is determined and assigned by cost matrix generation logic 27, which continuously monitors data availability in RAM 16 and data requests by the RAM controllers 36. Low cost set mapping logic 100 efficiently provides an optimized channel selection function, which enables individual RAM controllers 36a–36h to communicate efficiently with any RAM device 16a–16h based upon logic to be described hereafter.

This task is accomplished by efficiently mapping each RAM controller 36a–36h to each RAM device 16a–16h based upon the cost associated with each connection. While described herein as mapping each RAM controller 36 to each RAM device 16, the low cost set mapping logic 100 can be used in any application where it is desirable to map one set containing N elements to another set containing N elements.

FIGS. 4A–4E collectively illustrate the low cost set mapping logic 100 of FIG. 3 as applied to mapping a two element set into a two element set. Only the legal mappings convenient to cost calculation in hardware are considered during the optimization function. For example, when mapping an eight element set into another eight element set there are $2^{N-1}$ or $2^7=128$ legal mapping possibilities. In this manner a pseudo-optimal result is achieved using fewer than $\frac{2}{3}(N^2)$ adders and fewer than $\frac{1}{3}(N^2)$ comparators where N is the number of elements contained in each set. In accordance with the preferred embodiment this pseudo-optimal result is typically within approximately 10% of the optimal result.

For example, refer now to FIGS. 4A and 4B. Illustrated are the legal mapping possibilities for mapping two element set [A,B] into two element set [M,N]. As mentioned above, for sets having two elements, there are N!=2!=2 legal mappings. The mapping shown in FIG. 4A is considered an "up" mapping and the mapping shown in FIG. 4B is a "down" mapping. For example, an "up" mapping is one in which the term "up" indicates a slope up from left to right and a "down" mapping is one in which the term "down" indicates a slope down from left to right.

Each mapping has a cost associated therewith. FIG. 4C illustrates the value associated for each position in the matrix formed by set [A,B] and set [M,N]. Illustratively, the value associated with position AM is 1, the value associated with position AN is 3, the value associated with position BM is 0, and the value associated with position BN is 1. As mentioned above, the relative values assigned to each matrix position are assigned by cost matrix generation logic 27 of FIG. 3 in such a way that a higher value equates to a lower cost.

Ellipses encompassing the values in FIG. 4C illustrate a summing function that adds the values within each ellipse in order to determine the relative cost of each possible mapping solution. The ellipse in bold represents that the value of 3 (BM+AN) was compared to the value of 2 (AM+BN) and selected as optimal thereover. In the foregoing example, by selecting the values in such a way that the summations are maximized, the maximized values correspond to a minimized cost.

FIGS. 4D and 4E illustrate that by summing the values inherent in each mapping possibility and then comparing the sums, a cost optimized mapping is created. For this example, the cost associated with mapping 1 (FIG. 4D)=1+1=2 and the cost associated with mapping 2 (FIG. 4E)=0+3=3, therefore the mapping shown in FIG. 4E (value=3) is selected as optimal (i.e., having a lower cost) over the mapping shown in FIG. 4D (value=2). The ellipse in bold (in FIG. 4C) represents the chosen mapping possibility based upon a value of 3 being compared to a value of 2, whereby in this example, the value of 3 being more desirable than a value of 2.

When mapping a two element set into another two element set the computational logic is manageable. However, as the set size increases the computation requirements quickly increase. For example, mapping a set containing eight elements into another set containing eight elements involves 8! or 40320 legal mapping possibilities. To sum and compare each possible legal mapping possibility would require an excessive amount of computational resource. By employing the low cost set mapping logic 100, the resource required to efficiently map a set containing a large number of elements into another set containing a similarly large number of elements increases geometrically instead of exponentially, thus reducing the computational resource required.

FIGS. 5A–5D collectively illustrate four of the 24 possible legal mappings of four element set [A,B,C,D] into four element set [M,N,O,P]. Remember that for four element sets, there are 4!=24 legal mappings. The mappings shown in FIGS. 5A–5D are chosen at random.

FIG. 6A shows a sample value associated with each of the positions formed by the matrix intersection of four element set [A,B,C,D] and four element set [M,N,O,P] of FIGS. 5A–5D. Position AM is assigned a value of 0, position AN a value of 2, position AO a value of 3, and position AP a value of 3. The remaining positions are assigned values similarly. Remembering that a higher value implies a lower cost, the concept of the low cost set mapping logic 100 will now be described in detail.

FIGS. 7A–7F illustrate the operation of the low cost set mapping logic of FIG. 3 using the sample values of FIG. 6A. For mapping sets containing eight elements or more into sets containing eight elements or more, the computational requirements become excessive. Remember, a set mapping of eight elements into eight elements involves=8!=40320 legal mappings. The low cost set mapping logic 100 of the present invention provides a pseudo-optimal mapping solution by choosing a subset of all legal mappings to consider. This subset is chosen in such a way as to minimize the computational power required. The logic of the present invention will hierarchically build up a cost calculation by considering mappings of two element sets into two element sets. For example, when mapping a four element set into a four element set, initially consider only the four groups of two by two mappings, then compare the one two by two mapping of those selected values.

The hierarchical process that is embodied in the low cost set mapping logic 100 is applicable to mapping any power of two set size into any power of two set size. For example sets containing 2, 4, 8, 16, 32, . . . and so on, elements can be efficiently mapped into sets containing a like number of members.

Figures 7A, 7B, 7C, 7D, 7E, 7F:
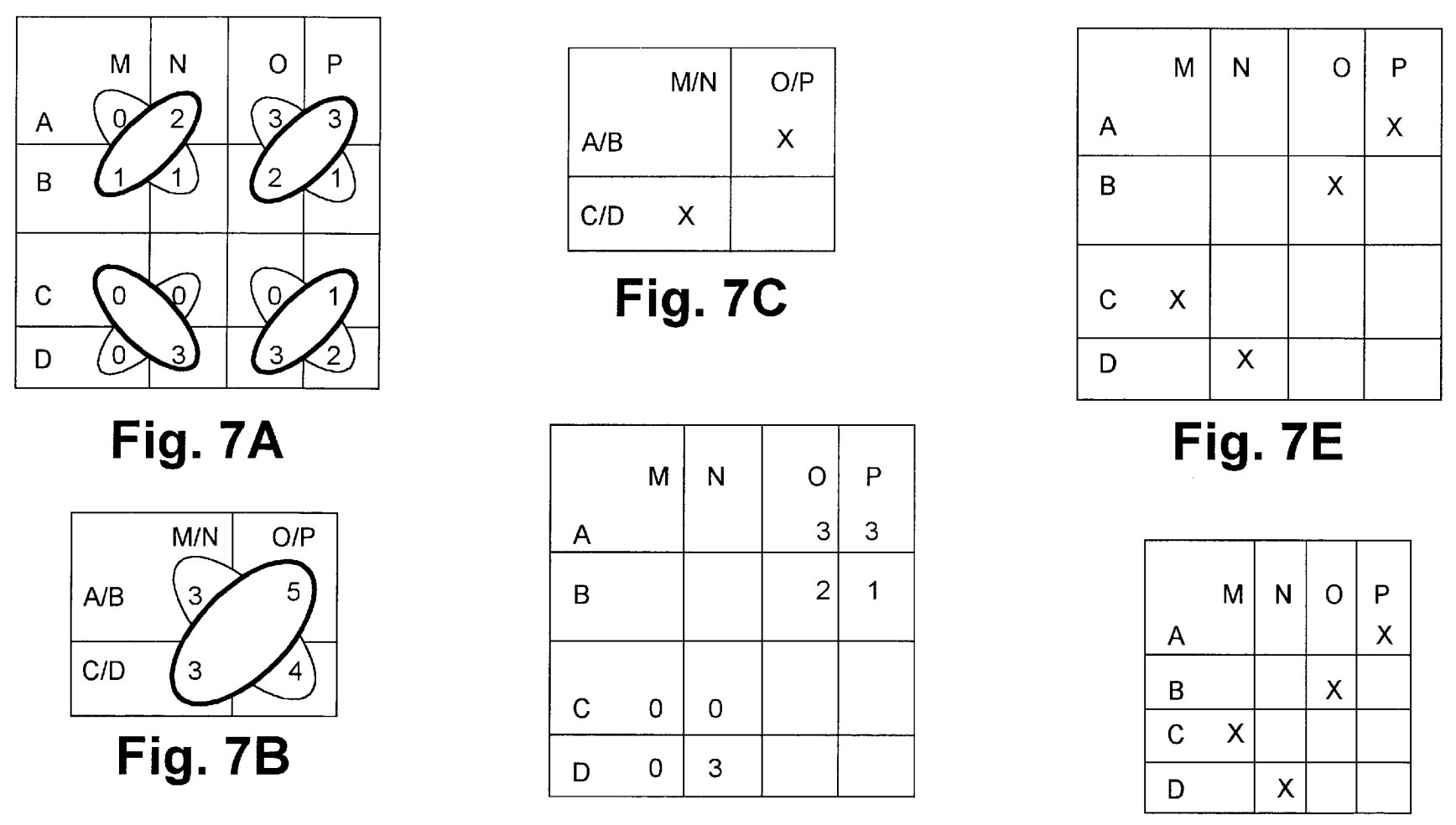

FIG. 7A illustrates four element set [A,B,C,D] reduced to two element set [A,B] and two element set [C,D] and illustrates four element set [M,N,O,P] reduced to two element set [M,N] and two element set [O,P]. The values associated with each position in the matrix are filled with those sample values described in FIG. 6A.

The ellipses encompassing the values in FIG. 7A depict summing operations similar to that described with respect to FIG. 4C with the bold ellipses indicating the mappings chosen by summing the values therein and comparing the sums. For ABMN choose 3 over 1 ("up" mapping), for ABOP choose 5 over 4 ("up" mapping), for CDMN choose 3 over 0 ("down" mapping), and for CDOP choose 4 over 2 ("up" mapping).

FIG. 7B illustrates that the chosen mappings are promoted up to a next level in a hierarchy. A/B, M/N gets the value of 3 (chosen over 1 in FIG. 7A), A/B, O/P gets the value of 5 (chosen over 4 of FIG. 7A), C/D, M/N gets the value of 3 (chosen over 0 of FIG. 7A), and C/D, O/P gets the value of 4 (chosen over 2 of FIG. 7A). As in FIG. 7A, the values are once again summed and compared, in this case choosing 8 over 7 ("up" mapping).

FIG. 7C shows the mapping choices reflected down the hierarchy resulting in selecting position C/D, M/N and position A/B, O/P, which correspond to the summed value of 8 of FIG. 7B. FIG. 7D shows the sets expanded back to four two by two sets with the positions chosen in FIG. 7C (C/D, M/N and A/B, O/P) having the original sample values shown in FIG. 6A replaced therein.

FIG. 7E shows the mapping positions filled in using the results obtained in FIG. 7D. FIG. 7F shows the final selected mapping solution chosen by operation of the low cost set mapping logic 100. The solution shown in FIG. 7F is, by coincidence, the optimal mapping solution, however that is not always expected by using the low cost mapping logic of the present invention. When mapping an eight element set into an eight element set a solution representing, on average, approximately 90% of optimal is expected.

In the foregoing illustration the low cost set mapping logic 100 required the use of ten, 2-input adders and five comparators. Had all legal mapping combinations been considered, 72 2-input adders and 23 comparators would have been required. The relative simplification increases as the set size increases.

FIG. 6B shows an alternative embodiment of the sample values assigned to each position of the matrix of FIG. 6A. The cost array and sets can be offset by 1 in the "x" and "y" directions such that the low cost set mapping logic 100 operates on a slightly different set of data. For example, while the values associated with each position in the matrix of FIG. 6A will remain the same, by offsetting the calculation by 1 in the "x" direction and 1 in the "y" direction (FIG. 6B) and performing the calculation in parallel using both the cost matrix of FIG. 6A and FIG. 6B, the low cost set mapping logic 100 will perform the calculation twice and select the optimal result. In this manner two copies of the low cost set mapping logic 100 are executed resulting in two pseudo-optimal set mapping solutions from which an external selector (not shown) will select the best solution.

Figure 8:
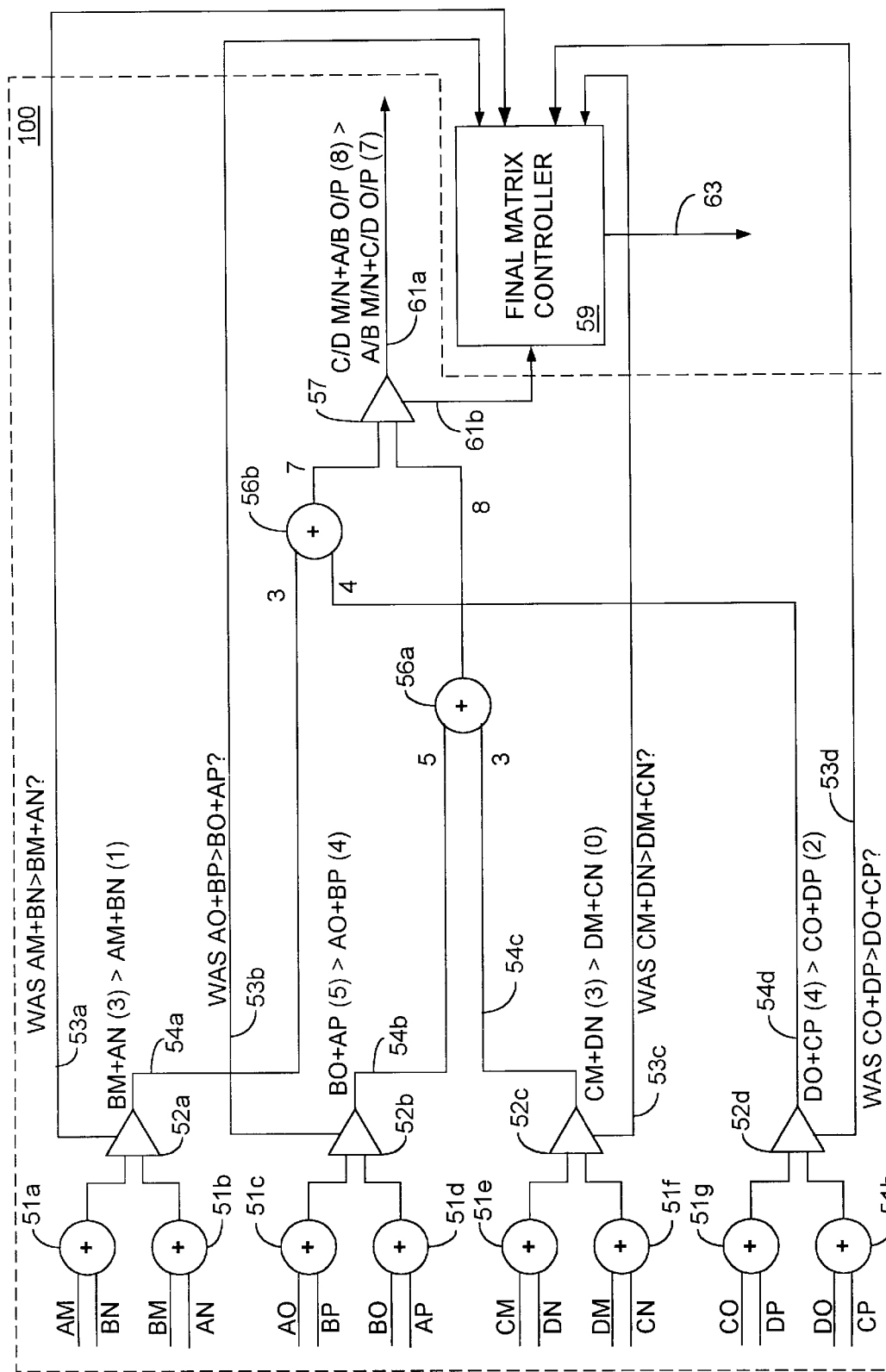
FIG. 8 is a schematic view illustrating the architecture of the low cost set mapping logic of FIG. 3.

FIG. 8 illustrates the low cost set mapping logic 100 in architecture. Adders 51a through 51h receive as input a value of each position of the matrix formed by set [A,B,C,D]

and set [M,N,O,P], however as shown in FIG. 7A both sets [A,B,C,D] and [M,N,O,P] are reduced to two element sets [A,B], [C,D], [M,N] and [O,P] respectively.

Adder 51a sums the value of position AM (value=0) with the value of position BN (value=1) resulting in a value of 1. This value is then supplied to comparator 52a. Similarly, adder 51b sums the value of position BM (value=1) with the value of position AN (value=2) resulting in a value of 3, which is supplied to comparator 52a. Comparator 52a compares the values (1 and 3) and selects the value of 3. The value of 3 represents the sum BM+AN, which becomes the value associated with position A/B, M/N of FIG. 7B. This value is output from comparator 52a on connection 54a for input to adder 56b. Another output of comparator 52a on connection 53a is the boolean greater than/less than compare (i.e., was AM+BN>BM+AN?) output for input to final matrix controller 59. The foregoing is repeated in adders 51c–51h and in comparators 52b–52d for each of the values in the matrix formed by sets [A,B], [C,D], [M,N] and [O,P]. For example, comparator 52b provides the value of 5 (BO+AP) on connection 54b to adder 56a, comparator 52c provides the value of 3 (CM+DN) on connection 54c to adder 56a, and comparator 52d provides the value of 4 (DO+CP) on connection 54d to adder 56b. Comparators 52b–52d also provide the boolean greater than/less than compare outputs on connections 53b (was AO+BP>BO+AP?), 53c (was CM+DN>DM+CN?) and 53d (was CO+DP>DO+CP?) for input to final matrix controller 59.

The sum outputs of comparators 52a–52d are supplied to adders 56a and 56b on connections 54a, 54b, 54c and 54d respectively. Adder 56a sums the value of location A/B, O/P (value=5) and the value of location C/D, M/N (value=3) of FIG. 7B, and supplies the result (8) to comparator 57. Similarly, adder 56b sums the value of location A/B, M/N (value=3) and the value of location C/D, O/P (value=4) of FIG. 7B, and supplies the result (7) to comparator 57. Comparator 57 then compares the results and chooses 8 (C/D, O/P). Comparator 57 also supplies the greater than/less than compare output (i.e., was C/D M/N+A/B O/P>A/B M/N+C/D O/P?) on connection 61b to final matrix controller 59.

The greater than/less than outputs of comparators 52a, 52b, 52c, 52d and 57 on connections 53a, 53b, 53c, 53d and 61b respectively, contain all the information necessary to decode the selected mapping and determine the pseudo-optimal set mapping solution. This data can be output from low cost set mapping logic 100 directly and used elsewhere, for example by another control machine that could decode the information in a manner useful to it's particular function, or it can be decoded by final matrix controller 59 as follows.

The inputs to final matrix controller 59 are the greater than/less than compare outputs of comparators 52a, 52b, 52c, 52d and 57 on connections 53a, 53b, 53c, 53d and 61b respectively. For example, the inputs to final matrix controller 59 are:

CMP52a=Greaterthan/Lessthan Compare Out=1 if "up" selected (BM+AN>AM+BN)
CMP52b=Greaterthan/Lessthan Compare Out=1 if "up" selected (BO+AP>AO+BP)
CMP52c=Greaterthan/Lessthan Compare Out=1 if "up" selected (CM+DN>DM+CN)
CMP52d=Greaterthan/Lessthan Compare Out=1 if "up" selected (DO+CP>CO+DP)
CMP57=Greaterthan/Lessthan Compare Out=1 if "up" selected (C/D M/N+A/B O/P>A/B M/N+C/D O/P), where
1=configuration "up"
0=configuration "down".

The outputs on connection 63 from final matrix controller 59 are:
1=that connection is selected
0=that connection not selected
AM=BN=!CMP52a && !CMP57
BM=AN=CMP52a && !CMP57
CM=DN=!CMP52c && CMP57
DM=CN=CMP52c && CMP57
AO=BP=!CMP52b && CMP57
BO=AP=CMP52b &&CMP57
CO=DP=!CMP52d && !CMP57
DO=CP=CMP52d && !CMP57
where the "!" operator means NOT, and the "&&" operator means AND. In this manner, the mapping solution shown in FIG. 7F is decoded.

It will be obvious to those skilled in the art that many modifications and variations may be made to the preferred embodiments of the present invention, as set forth above, without departing substantially from the principles of the present invention. For example, the low cost set mapping logic is applicable to use in communications systems as well as computer graphics systems. All such modifications and variations are intended to be included herein within the scope of the present invention, as defined in the claims that follow.

What is claimed is:

1. A method for efficiently mapping information from a first set to a second set, comprising the steps of:
   partitioning a first set having a plurality of elements into at least one first two element subset;
   partitioning a second set having a plurality of elements into at least one second two element subset;
   assigning a value to each location of a matrix occupied by each of said elements of said first two element subset and said second two element subset;
   calculating a cost associated with mapping each element of said first set into each element of said second set; and
   determining a pseudo-optimal mapping solution based upon said calculated cost.

2. The method as defined in claim 1, wherein the step of calculating further comprises the steps of:
   adding a value associated with a first position in said matrix with a value associated with a second position of said matrix, the resultant value representing a cost associated with said first position and said second position; and
   comparing said added value to determine an optimal mapping solution.

3. The method as defined in claim 1, wherein the mapping method occurs in a computer graphics system.

4. An apparatus for efficiently mapping information from a first set to a second set, comprising:
   logic configured to partition a first set having a plurality of elements into a first two element subset;
   logic configured to partition a second set having a plurality of elements into a second two element subset;
   logic configured to assign a value to each location of a matrix occupied by each of said elements of said first two element subset and said second two element subset;
   a plurality of adders, each adder configured to add a first value to a second value and to determine a cost associated with mapping each element of said first set into each element of said second set; and
   a plurality of comparators, each comparator configured to compare the output of each of said adders, wherein the result of each of said comparators is used to determine a pseudo-optimal mapping solution based upon said determined cost.

5. The apparatus as defined in claim 4, wherein said first set and said second set contain N-elements.

6. The apparatus as defined in claim 4, further comprising controller logic configured to map an output of each of said comparators based upon said first and said second values.

7. The apparatus as defined in claim 4, wherein said first set and said second set contain information to be mapped in a computer graphics system.

8. A computer readable medium having a program for efficiently mapping information from a first set to a second set, the medium comprising:

logic configured to partition a first set having a plurality of elements into at least one first two element subset;

logic configured to partition a second set having a plurality of elements into at least one second two element subset;

logic configured to assign a value to each location of a matrix occupied by each of said elements of said first two element subset and said second two element subset;

logic configured to calculate a cost associated with mapping each element of said first set into each element of said second set; and logic configured to determine a pseudo-optimal mapping solution based upon said calculated cost.

9. The medium as defined in claim 8, wherein the logic configured to calculate further comprises:

logic configured to add a value associated with a first position in said matrix with a value associated with a second position of said matrix, the resultant value representing a cost associated with said first position and said second position; and logic configured to compare said added value to determine an optimal mapping solution.

10. The medium as defined in claim 8, wherein the first set and the second set contain information to be mapped in a computer graphics system.

* * * * *